United States Patent [19]

Nakayama et al.

[11] Patent Number: 4,548,864
[45] Date of Patent: Oct. 22, 1985

[54] MAGNETIC RECORDING MEDIUM HAVING AN ORGANIC METAL UNDERLAYER

[75] Inventors: Masatoshi Nakayama; Toshiaki Izumi, both of Saku, Japan

[73] Assignee: TDK Corporation, Tokyo, Japan

[21] Appl. No.: 529,189

[22] Filed: Sep. 6, 1983

[30] Foreign Application Priority Data

Oct. 29, 1982 [JP] Japan ................................ 57-188984

[51] Int. Cl.$^4$ .............................................. G11B 5/62
[52] U.S. Cl. .................................... 428/336; 428/693; 428/694; 428/699; 428/900
[58] Field of Search ............... 428/693, 694, 470, 699, 428/900, 336; 427/131, 126.4, 126.5, 126.6

[56] References Cited

U.S. PATENT DOCUMENTS 4,307,156  12/1981  Yanagisawa ........................ 428/693
4,429,024   1/1984  Ueno et al. ......................... 428/694

Primary Examiner—Marion E. McCamish
Assistant Examiner—William M. Atkinson
Attorney, Agent, or Firm—Seidel, Gonda, Goldhammer & Abbott

[57] ABSTRACT

A magnetic recording medium comprises a base, a thin ferromagnetic metal film, and a plasma-polymerized organic material layer sandwiched between them. The plasma-polymer is made of an organic metal and the layer is not less than 10 Å thick. The ferromagnetic metal film is composed mainly of a cobalt-nickel alloy and formed by vacuum deposition.

1 Claim, 1 Drawing Figure

MAGNETIC RECORDING MEDIUM HAVING AN ORGANIC METAL UNDERLAYER

BACKGROUND OF THE INVENTION

This invention relates to a magnetic recording medium, and more specifically to such a medium having a thin ferromagnetic metal film formed on the base characterized by a layer of a plasma-polymerized organic material sandwiched between the base and the ferromagnetic film.

Magnetic recording mediums of the type consisting of a substrate coated with a magnetic coating composition of a ferromagnetic powder and an organic binder have been extensively used. With those coated mediums, however, the presence of the binder renders it theoretically next to impossible to attain a greater residual magnetic flux density than the range of 3,000 to 4,000 gauss. Recently, qualitative improvements in and fast spreading market for magnetic recording mediums have created a steadily growing demand for those mediums capable of higher density recording of information than heretofore. To meet this requirement magnetic recording mediums of the thin ferromagnetic film type are under development. The thin metal film type medium is obtained by forming a thin film of a ferromagnetic metal, e.g., an iron family element or alloy, on a base by vacuum deposition, sputtering, ion plating, ion beam deposition, electrochemical deposition or the like. Of those techniques, vacuum deposition is deemed the most promising method for obtaining great lengths of film on an industrial scale, and much research is being made by many workers.

The magnetic recording medium is required to possess important properties, and the still characteristic in particular. If good still reproduction is to be ensured during the playback of the medium on a video tape recorder it is imperative to avoid the wear of the magnetic tape surface due to its contact with the reproducing heads. For example, with a VTR of a certain system, still reproduction is effected by scanning a given portion of the tape arcuately held along a rotating head by means of two magnetic heads attached 180° apart to a fast rotating drum. If the tape has a low wear resistance, the scanning will gradually scrape out the tape surface to shorten the still duration. It is therefore important to minimize the tape wear on scanning by the magnetic heads running at a high speed and extend the reproduction time. This is particularly true with the narrow-track heads that have come into use to meet the requirement for high density recording but which badly shorten the still-sustaining time.

Efforts have been made to prolong the still duration of the coated type magnetic recording mediums by introducing varied abrasives into the coats on the tapes, and they have given favorable results.

On the other hand, the thin metal film type can scarcely be improved in the still characteristic for a number of reasons, including the difficulty of adding those abrasives and the thinness of the layer.

Attempts to improve the wear resistance of the thin metal film type by forming a special top coat on the magnetic layer have proved effective to some extent, but alternatives have been called for since the top coating invites other drawbacks.

As a result of a search for such an alternative, it has now been found that the still reproduction time can be extended by sandwiching a thin organic material layer, preferably an organometallic layer, formed by plasma polymerization between the base and the thin ferromagnetic metal layer. The present invention is predicated upon this discovery.

BRIEF DESCRIPTION OF THE DRAWING

The single figure

DETAILED DESCRIPTION OF THE INVENTION

Figure 1:
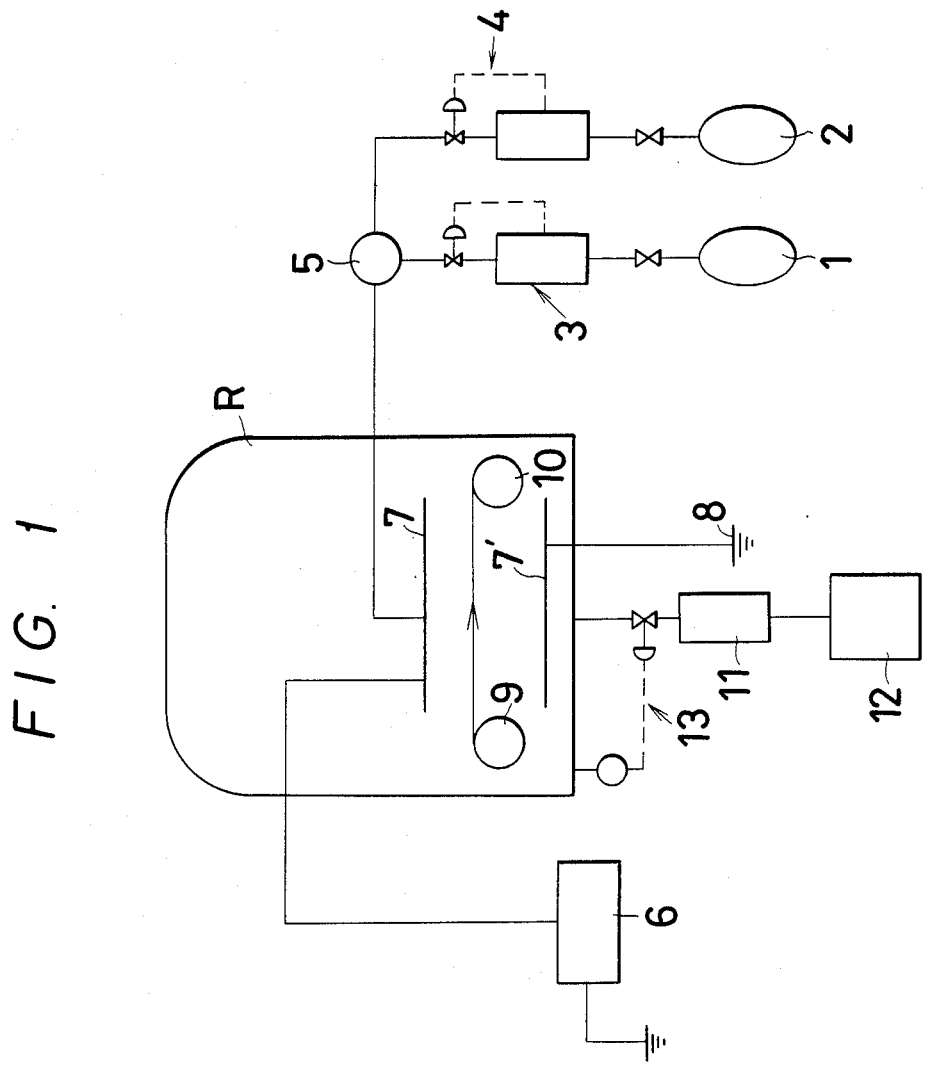
FIG. 1 is a schematic diagram of an apparatus for plasma polymerization to be employed in practicing the present invention.

The magnetic recording medium of the thin ferromagnetic metal film to which this invention is applicable consists of a magnetic recording layer of an iron family element, e.g., iron, nickel, or cobalt, or an alloy of those elements, or an alloy further containing a third element or elements which is formed to a thickness of about 0.05–0.1 $\mu$m on a usually employed base, such as of polyethylene terephthalate, polyimide, alamide, or polyethylene naphthalate. Vapor deposition is the most common of the methods for forming the magnetic recording layer. For the vapor deposition varied techniques have been proposed to increase the coercive force and improve the squareness ratio of the deposited layer. They include deposition at oblique incidence, evaporation in magnetic field, and heat treatment, of which the first-mentioned is most helpful in enhancing the magnetic properties of the layer.

As its name implies, the oblique-incidence deposition is a technique utilizing the phenomenon in which uniaxial magnetic anisotropy is acquired by deposition of evaporated atoms at a slant to the base surface. The phenomenon involves such a complex mechanism that the causes of magnetic anisotropy are yet to be clarified perfectly. In general, self-shadowing effects, columnar crystal growth, and magnetostrictive effects are believed contributory to the development of the anisotropy. The most popular procedure of the oblique-incidence deposition is to cause a substrate to run in a vacuum tank from a supply reel to a takeup reel past and around a part of the periphery of a cylindrical can, and then direct a metal vapor from a ferromagnetic metal vapor source to the substrate running along the can so that the particles impinge at an oblique angle of incidence on the surface. The cylindrical can is cooled with a gas or liquid to dissipate the heat from the substrate.

A typical thin ferromagnetic metal film is formed by the oblique-incidence method, e.g., by depositing an evaporated material consisting mainly of a cobalt-nickel [e.g., Co:Ni=80:20 (weight ratio)] alloy at an incident angle of approximately 60°–80° to form a layer about 0.06–0.10 $\mu$m thick on the substrate. The resulting layer, with a coercive force in the range of about 900–1,000 Oe and a residual flux density of about 6,000–8,500 G, is appropriate for high-density magnetic recording.

The magnetic recording medium of the thin ferromagnetic film type, as noted above, cannot sustain still reproduction for long. For example, the medium using a cobalt-nickel alloy has a still duration of only about 10 minutes. According to this invention, the still time can be extended by first forming an organic plasma-polymerized film on the base and then depositing a thin ferromagnetic metal film thereon by vapor deposition or the like.

The process of plasma polymerization consists of mixing discharged plasma of a carrier gas, e.g., Ar, He, $H_2$, or $N_2$, with a monomer gas, and bringing the mixed gas into contact with the surface of the base to form a plasma-polymerized film thereon. In principle an electric field is applied to the gas kept at a low pressure, and the free electrons present in a small amount in the gas are subjected to an electric field acceleration because of the much larger intermolecular distance than under ordinary pressure, and they acquire a kinetic energy (electron temperature) of 5 to 10 eV. As the atoms at this velocity collide with other atoms or molecules, they break the atomic or molecular orbitals and dissociate them into normally instable chemical species, such as electrons, ions, and neutral radicals. The dissociated electrons are again subjected to the electric field acceleration to dissociate, in turn, other atoms and molecules. This chain action quickly changes the gas to a highly ionized state, or to the form known as a plasma gas. With few chances of collision with electrons, the gas molecules absorb little energy and are kept at a temperature close to the ordinary level. The system in which the kinetic energy of electrons (electron temperature) and the thermal motion of the molecules (gas temperature) have been separated is called a low temperature plasma, where the chemical species retain comparatively much of their original forms and are in conditions ready for an additive chemical reaction such as polymerization. The present invention contemplates taking advantage of the above conditions in forming a plasma-polymerized film over a base. The low temperature plasma does not have any unfavorable thermal effect upon the base.

The monomer gas to be used in the invention is any of the ordinary plasma-polymerizable organic compounds, including carbon-hydrogen, carbon-hydrogen-oxygen, carbon-halogen, carbon-oxygen-halogen, and carbon-hydrogen-halogen systems and organic metals in general. Organosilicon compounds such as various silanes containing siloxane linkages, and various sulfur- or nitrogen-containing organic compounds are useful, too. For the purposes of the invention organic metals have been found particularly desirable.

A thin film of a plasma-polymerized organometallic polymer can be formed by mixing a discharged plasma of a carrier gas, e.g., Ar, He, $H_2$, or $N_2$, with an organometallic gas or a gas generated by dissolving an organic metal in an organic solvent and then bringing the mixed gas into contact with the base surface to be treated. The organometallic gas to be employed may be any of plasma-polymerizable organic compounds and complex salts of, e.g., tin, titanium, aluminum, cobalt, iron, copper, nickel, manganese, zinc, lead, gallium, indium, mercury, magnesium, selenium, arsenic, gold, silver, cadmium, and germanium. Examples are given below by groups of the formulas (in which R represents an organic group and X represents hydrogen or a halogen):

(A) $M^I R$ Phenylcopper, phenylsilver, etc.

(B) $M^{II}R_oX_{2-o}$ (where O=1, 2) Diethylzinc, dimethylzinc, methylmercury iodide, methylmagnesium iodide, ethylmagnesium bromide, dimethylmercury, dimethylselenium, dimethylmagnesium, diethylmagnesium, diphenylmagnesium, dimethylzinc, di-n-propylzinc, di-n-butylzinc, diphenylzinc, di-phenylcadmium, diethylmercury, di-n-propylmercury, allylethylmercury, diphenylmercury, etc.

(C) $M^{III}R_pX_{3-p}$ (where p=1, 2, 3) Trimethylaluminum, triethylaluminum, triisobutylaluminum, trimethylgallium, trimethylindium, diethylaluminum chloride, trimethylgold, etc.

(D) $M^{IV}R_qX_{4-q}$ (where q=1, 2, 3, 4) Tetramethyltin, di-n-butyltin maleate, dibutyltin diacetate, tetra-n-butyltin, tetraethyllead, tetramethylgermanium, tetraethylgermanium, diethylcyclogermanahexane, tetraphenylgermanium, methylgermanium, ethylgermanium, n-propylgermanium, triethylgermanium, diphenylgermanium, triphenylgermanium, trimethylbromogermanium, triethylbromogermanium, triethylfluorogermanium, triethylchlorogermanium, dimethyldichlorogermanium, methyltrichlorogermanium, diethyldichlorogermanium, diethyldibromogermanium, diphenyldibromogermanium, diphenyldichlorogermanium, ethyltrichlorogermanium, ethyltriboromogermanium, n-propyltrichlorogermanium, tetraethyltin, trimethylethyltin, tetraallyltin, tetraphenyltin, phenyltrimethyltin, triphenylmethyltin, dimethyltin dichloride, dimethyltin dihydride, trimethyltin hydride, triphenyltin hydride, tetramethyllead, tetra-n-propyllead, tetraisopropyllead, trimethylethyllead, trimethyl-n-propyllead, dimethyldiethylled, etc.

(E) $M^{VI}R_{6-r}$ (where r=1, 2, 3, 4, 6) Hexaethylgermanium, hexamethylditin, hexaethylditin, hexaphenylditin, etc.

(F) Acetylacetone complexes Acetylacetonetitanium, acetylacetonealuminum, acetylacetonecobalt, acetylacetone iron, acetylacetonecopper, acetylacetonenickel, acetylacetonemanganese, etc.

Note:

R is an organic group, e.g.,
 a $C_{1-10}$ (preferably $C_{1-6}$) alkyl,
 a $C_{2-6}$ alkenyl (allyl),
 an aryl (phenyl), or
 an acyloxy (maleoyl or acetyl); and X is a halogen, e.g., fluorine, chlorine, bromine, or iodine.

Besides, phenylarsine oxide and the like are also employable.

The accompanying drawing schematically illustrates a plasma polymerizer that depends on high-frequency discharge for the formation of a thin film plasma-polymerized film on the base of a magnetic recording medium..

Referring to the drawing (FIG. 1), a polymerization reaction vessel R is supplied with a monomer gas from its source 1 and a carrier gas from its source 2 through mass flow controllers 3, 4, respectively, and after mixing by a mixer 5. The monomer gas, or the material to be polymerized in the reaction vessel, is chosen in accordance with the invention from among the plasma-polymerizable substances. The carrier gas is suitably chosen from Ar, He, $H_2$, $N_2$, etc. The monomer gas is fed at a flow rate in the range of 1 to 100 ml/min and the carrier gas in the range of 50 to 500 ml/min. Inside the reaction vessel R are installed means for supporting the base of the magnetic recording medium to be treated, the means in the arrangement shown being a supply roll 9 and a takeup roll 10 intended for the treatment of a magnetic tape base. Depending on the form of the base to be handled, various other support means may be employed including, for example, stationary rotating supporters. A pair of electrodes 7, 7' are disposed horizontally in parallel, along the passage for the magnetic tape base in between. One electrode 7 is connected to a high-frequency power source 6 and the other electrode 7' is grounded at 8. The vessel R is further equipped with a vacuum system for its evacuation, which comprises a liquid nitrogen trap 11, a rotary oil-seal pump 12, and a vacuum controller 13. This vacuum system maintains a vacuum degree of 0.01 to 10 Torr inside the vessel. In order that the thickness of the plasma-polymerized film can be varied as desired, means (not shown) for controlling the takeup roll speed may be installed.

In operation, the reaction vessel R is first evacuated by the rotary oil-seal pump to a degree higher than $10^{-3}$ Torr, and is supplied with the monomer gas and the carrier gas at predetermined flow rates in a mixed state. The degree of vacuum in the vessel is controlled within the range of 0.01 to 10 Torr. At the point the magnetic tape base speed and the flow rates of the monomer and carrier gases have become steady, the high-frequency power source is switched on. Then, a plasma-polymerized film is deposited on the traveling magnetic recording medium base. A plasma-polymerized film of the desired thickness is formed by controlling at least one of the three factors; the gas flow rates, reaction time, and tape base speed. The moment the plasma color inherent to the monomer has just died away is regarded as the end point of the reaction.

For the plasma source, microwave, DC, or AC discharge may be utilized as well as the high-frequency discharge.

The base thus coated with the plasma-polymerized film is then treated, e.g., by vacuum deposition, for the formation thereon of a thin ferromagnetic metal film.

The thickness of the plasma-polymerized film varies with the desired characteristics of the magnetic recording layer and the kind of the plasma-polymerizable material chosen, but deposition of a thickness above a certain minimum is advisable. It appears that a polymer film at least 10 Å thick is satisfactory if the still duration is to be about three times as long as when no such plasma-polymerized film is provided.

The plasma-polymerized film has a tridimensionally developed, dense and strong polymer structure and is highly adhesive to the base. This structure is presumably the factor that imparts good still characteristic with prolonged duration to the magnetic recording medium.

The adhesive power between a polymer face and a metal film is not so strong. On one hand, the adhesive power between an organic metal plasma polymerized film and a metal film is strong, probably due to the contribution of metallic bonding. The adhesion of a polymer and a plasma polymerized film is of course strong. An organic metal plasma polymerized film which has combined properties of organic material and metal is very effective as interposed layer for strengthening the adhesion between a polymer substrate and a metal magnetic film. It is considered that such fact is one of the reasons why good still characteristic is given.

EXAMPLES

Thin organotin polymer layers of varied thicknesses were formed by plasma polymerization on a common length of 12 μm-thick polyethylene terephthalate film. The apparatus used was that shown in the drawing. The conditions for the plasma polymerization were as follows:

| Monomer gas: | Tetramethyltin |
| Monomer gas flow rate: | 10 ml/min |
| Carrier gas: | Argon |
| Carrier gas flow rate: | 50 ml/min |
| Degree of vacuum: | 0.5 Torr |
| High-frequency power supply: | 13.56 MHz, 200 W |

The thickness of the plasma-polymerized film was changed stepwise by shifting the film feed speed. At the film speed of 5 m/min, e.g., a 50 Å-thick plasma-polymerized film was deposited on the base.

The thicknesses and uniformity of the plasma-polymerized films thus formed were determined by the multiple interference method and with an ellipsometer. It was confirmed that intended thicknesses with uniformity had been attained. Confirmatory tests with a Fourier-transformation infrared spectrophotometer and by ESCA proved that the polymerized films were of a tin-containing polymer.

Over each plasma-polymerized film on the base, a thin ferromagnetic film of a cobalt-nickel (4:1 by weight) alloy was formed by vacuum deposition. The alloy material was evaporated by electron-beam heating and deposited by the oblique-incidence technique at a central incidence angle of 70°. A cylindrical can was used to cool the base film, with the coolant maintained at 5° C. The vacuum vessel was evacuated to $3 \times 10^{-3}$ Pa, oxygen gas was introduced up to a vessel pressure of $6.3 \times 10^{-2}$ Pa, and vapor deposition was carried out. The power given to the electron gun and the speed at which the base film was driven were adjusted so as to obtain a film thickness of 800 Å. An analysis of the resultant film revealed that it was of the same composition as the mother alloy. The ferromagnetic film so obtained was suitable for a magnetic recording medium, with a coercive force of about 1,000 Oe and a residual flux density of about 6,500 G.

Finally, the test length sections were cut off and slitted to a width of ½ in. (1.27 cm) to prepare magnetic recording tapes for testing.

With each tape specimen the thickness of the plasma-polymerized film and the still reproduction duration were measured and the results are given in Table 1. The still duration represents the period of time in which a single signal recorded at 4 MHz on a commercially available VTR of the VHS system (manufactured by Victor Company of Japan) is reproduced still on a screen and then the image fades away. As a comparative example, a tape was made by depositing a thin film in the same way as described above but directly on the base film, without the interposition of any plasma-polymerized film. The result of the specimen, with a film thickness of zero, is also shown.

TABLE 1

| | Thickness, plasma-polymd film (Å) | | | | | |
|---|---|---|---|---|---|---|
| | 0 | −5 | −10 | −20 | −50 | −100 |
| Still duration (min) | −10 | 15−20 | >30 | >60 | >60 | >60 |

It can be seen from the table that the test specimens having plasma-polymerized films thicker than 10 Å have excellent still durability, with their durations more than three times that of the specimen without such a film.

What is claimed is:

1. A magnetic recording medium comprising a base, a plasma-polymerized organic metal polymer layer formed on said base, the metal of said organic polymer being selected from the group consisting of Sn, Ti, Al, Co, Fe, Cu, Ni, Mn, Zn, Pb, In, Hg, Mg, Au, Ag, and Cd, said plasma-polymerized layer having a thickness of 10 to 100 angstroms, and a thin ferro-magnetic metallic film formed on said plasma-polymerized layer.

* * * * *